United States Patent [19]
Miller et al.

[11] Patent Number: 5,245,367
[45] Date of Patent: Sep. 14, 1993

[54] ANNULAR MASK CONTACT LENSES

[76] Inventors: David Miller, 9 Francis St., Brookline, Mass. 02146; Leroy Meshel, 1850 Sullivan Ave., Daly City, Calif. 94015

[21] Appl. No.: 791,121

[22] Filed: Nov. 12, 1991

[51] Int. Cl.$^5$ .............................................. G02C 7/04
[52] U.S. Cl. .................................... 351/161; 351/177
[58] Field of Search ............... 351/160 R, 160 H, 161, 351/162, 177

[56] References Cited

U.S. PATENT DOCUMENTS

| | | | |
|---|---|---|---|
| 3,557,261 | 1/1971 | Wichterle | 351/162 X |
| 3,794,414 | 2/1974 | Wesley | 351/161 |
| 4,955,904 | 9/1990 | Atebara et al. | 623/6 |

OTHER PUBLICATIONS

Fontana, "Coping with the Nystagmoidalbino: Lens Designs that Really Work", *Review of Optometry*, Dec., 1979, p. 36.
Takahashi, "The Use and Interpretation of the Pinhole Test", *Optometric Weekly*, vol. 56, No. 18, May 6, 1965, pp. 83–86.
"A Pinhole Contact Lens", *The Optician, Jun. 23, 1950*, p. 623.
Sefchek, "Latest Cosmetic Bifocal Fitting Technique".
Wesley, "Research on the Multi-Range Lens".
Sefchek, "An Interim Report: Field Studies of Cosmetic Bifocal Contact Lens Patients".

*Primary Examiner*—Scott J. Sugarman
*Attorney, Agent, or Firm*—Lahive & Cockfield

[57] ABSTRACT

An annular mask contact lens designed to operate with the normal functioning of the human pupil. An annular mask forms a small pinhole-like aperture on the contact lens enabling continual focus correction. The outer diameter of the annular mask allows the patient to transmit more light energy through the pupil as brightness levels decrease. The contact lens may be fitted with two separate and distinct optical corrections, both at he small aperture region and in the region beyond the annular mask. Functional imaging is thus achieved for both bright and dim lighting, and over a wide range of viewing distances.

17 Claims, 3 Drawing Sheets

ANNULAR MASK CONTACT LENSES

BACKGROUND OF THE INVENTION

This invention concerns vision correction and, in particular, annular mask contact lenses and related methodology.

Contact lenses are commonplace today. Most individuals with minor vision ailments can quickly acquire and use these lenses in place of prescription eye glasses. This is not true, however, for individuals stricken with poor vision or even for those presbyopic persons requiring bifocal glasses. These individuals are left with little choice in selecting contact lenses; and the lenses which are available typically encumber these patients with other difficulties. For example, presbyopic individuals can opt for bifocal contact lenses, but usually find it difficult to maintain focus during eye movement, or only see clearly at one viewing distance.

The long felt need to develop more versatile lenses has led designers to pinhole contact lenses. These lenses endeavor to utilize the known theories of pinhole imaging, commonly understood in optics as a method to reduce geometrical aberrations, e.g., astigmatism, spherical aberration, and coma. By restricting a person's vision to a small "pinhole" aperture, visual deficiencies are greatly reduced or effectively removed. Unfortunately, the utility of this technology has been diluted because of designs and approaches inappropriate for corrective optometry. For upwards of 50 years pinhole contact lenses have been under consideration, yet they remain today commercially unsuccessful and largely unavailable. As a result, patients afflicted with relatively poor vision are typically unaided by contact lenses.

"Multiple Focal Contact Lenses", as described in U.S. Pat. No. 3,794,414, was one attempt to develop small-aperture contact lenses. This approach combined a pinhole-like aperture with radial slits and scalloped masking regions on a contact lens to supposedly correct both peripheral vision and the effects related to decentered contact lenses. The disclosed designs though, i.e., the use of scalloped patterns and radial slits, actually encourage diffraction effects at the retina. This reduces image quality. The very nature of small-aperture correction is to correct geometrical aberrations in excess of diffraction. Therefore, the benefits achieved according to that patent by incorporating the small, pinhole-like, aperture are likely offset by undesirable diffraction effects.

In addition, the teachings presented in the aforementioned patent do not generally consider the normal functioning of the human pupil. The single largest drawback in pinhole imaging is energy starvation. Small-aperture lenses improve image quality, but at the same time block significant amounts of light energy from reaching the retina. Under dim lighting conditions, a human pupil normally dilates. Without proper consideration, a small-aperture contact would equivalently place a person into darkness, even though the lighting is only dim or low.

Pinhole correction together with the normal functioning of the human pupil is considered in U.S. Pat. No. 4,955,904, which presents an intraocular lens surgically implanted within the eye. The patent, entitled "Masked Intraocular Lens and Method for Treating a Patient With Cataracts", affords cataract patients some form of vision correction through surgery. The intraocular lens is masked to form a pinhole that accommodates the function of the human pupil under different lighting conditions. But, intraocular lenses have operational and other drawbacks. They are not contact lenses; surgery is required and the lens must be permanently implanted with precision through the use of man-made loops. Furthermore, because of material requirements for implantation, these impenetrable lenses can transmit little or no oxygen, a feature widely available in contact lenses. Contact lenses, in addition, are conveniently installed and removed by the patient, and are held in place on the eye through tear tension.

With this background, an object of this invention is to provide an improved small-aperture contact lens, and in particular, one which considers the normal function of the human pupil.

Another object of this invention is to present a contact lens which provides functional imaging during both bright and dim lighting conditions, and over a wide range of viewing distances.

Yet another object of this invention is to provide a small-aperture contact lens and related methodology to selectively block highly aberrated portions of the eye.

Other objects of the invention are evident in the description that follows.

SUMMARY OF THE INVENTION

The present invention provides, in one aspect, a contact lens with a transparent lens body and two curvatures. The lens body has a concave surface, adapted to the patient's eye curvature, opposite a convex surface is optically powered to correct the patient's vision for a focus between near and far objects. The lens body has a light-blocking mask that forms an annulus pattern with a small, so-called pinhole aperture. The annular mask is arranged to accommodate the patient's pupil over different viewing distances and differing brightness levels. Thus, during bright light conditions, the annular mask obscures the Patient's Pupil except for the pinhole aperture. In dimmer light, light energy passes outside the annular mask through the patient's dilated pupil t reach the retina.

According to another aspect of the invention, the convex lens surface outside the annular mask is optically powered to correct the patient's vision for far objects. The contact lens thus created is bi-powered. The lens body is constructed to provide two separate and distinct optical corrections. The central aperture region is optically powered to correct the patient's vision for a focal point between near and far objects, while the lens body outside the annular masking region is optically powered to correct the patient's vision for far objects. This bi-powered arrangement, together with the pupil-sized annular mask, enables the patient to view both near and far objects comfortably, and under differing light conditions.

Another aspect of the invention provides a non-surgical method for treating patients with visual aberrations, especially those persons with poor vision, from distorted corneas, astigmatism, or with presbyopia. A contact lens is constructed in accordance with the invention by applying an annular mask to the lens body, fitting the lens to the patient's eye, and providing an optical correction on the lens body to correct the patient's vision for a focus between near and far objects. The annular mask is constructed to provide a small aperture at the center of the contact lens and hence at the patient's optical line of sight. The location and size of the annular mask are selected such that the light transmitting portion of the lens increases as the patient's pupil dilates during dimmer lighting.

According to a further aspect of the invention, the patient is fitted with an annular mask contact lens provided with two separate and distinct optical corrections. The region within the small, central aperture, which is inside the annular mark, corrects the patient's vision for a focus between far and near objects. The region outside the annular mask corrects the patient's vision for far objects.

In other aspects, the size and shape of the annular mask are optimized for a particular patient to minimize the visual defects presented by a particular patient. The mask can also be applied to areas outside the annular pattern to selectively block portions of the iris, such as those portions damaged or removed in surgery.

The advantages of a contact lens constructed in accordance with the invention are several. The lens improves a patient's vision over a wide range of viewing distances. The lens further improves a patient's vision even during differing brightness conditions by incorporating the normal function of the human pupil in the size of the light-blocking mask. Moreover, complex vision correction is provided in a multi-powered contact lens. If a patient has an area on the iris which is damaged or surgically removed, these portions can also be selectively blocked, according to the invention, for further vision improvement. In addition, a contact lens according to the invention does not encourage diffraction effects, thereby avoiding a reduction in visual acuity.

These and other aspects and features of the invention will become more fully understood in the detailed description.

BRIEF DESCRIPTION OF THE DRAWINGS

For a fuller understanding of the nature and objects of the invention, reference should be made to the following detailed description and the accompanying drawings, in which.

DETAILED DESCRIPTION OF ILLUSTRATED EMBODIMENTS

Figure 1:
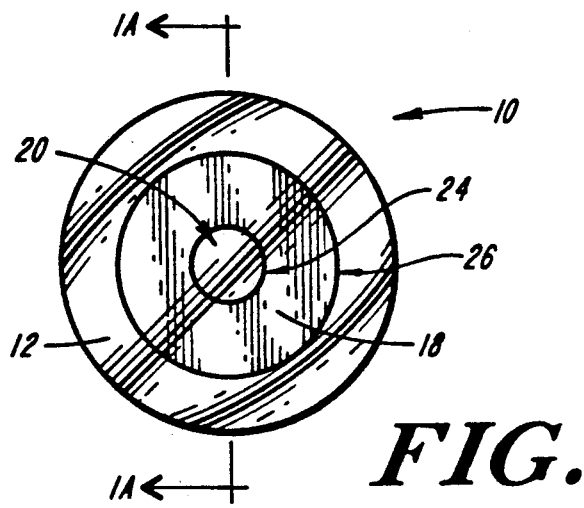
FIG. 1 is a plan view of an annular mask contact lens constructed in accordance with the invention.
Figure 1A:
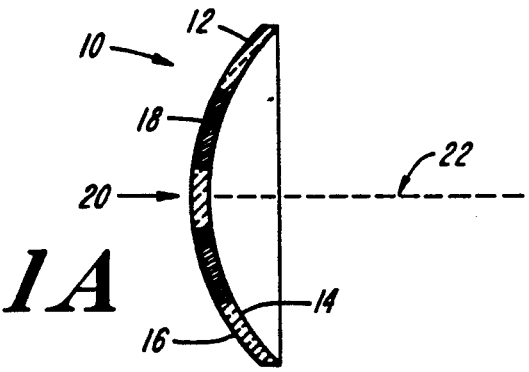
FIG. 1A is a diametrical sectional view of the lens of FIG. 1.

FIGS. 1 and 1A show a contact lens 10 constructed in accordance with the invention having a transparent lens body 12 fabricated with two curvatures, a concave surface 14, and a convex surface 16. The concave surface 14 is optically powered to adapt to the patient's eye curvature. The convex surface 16 is optically powered to correct the patient's vision for an intermediate distance, typically midway between near and far objects. Focusing is achieved both by the contact lens 10 and by the eye's own refractive capability.

The contact lens 10 has an annular light-blocking mask 18 This annular mask 18 is optically arranged to form a small, pinhole-like aperture 20 at approximately the center of the lens body 12 and at the patient's optical line-of-sight 22.

Constructed in this fashion, the contact lens 10 operates as a pinhole imager and increases the depth of focus. Light rays from a single object in the field of view, and entering the pinhole aperture 20, are more tightly imaged at the retina than in the absence of the lens 10. This reduces the blurring at the retinal image and increases the patient's visual acuity. Normally, the typical geometrical vision deficiencies encountered in patients, like myopia, hyperopia, astigmatism, and presbyopia, spread out the light rays reaching the retina from a single object point in the field of view, thereby reducing image contrast. The pinhole aperture 20 limits these light rays to a small bundle entering the eye pupil, and thereby improves image contrast. Visual acuity is also improved over a large range of viewing distances because defocus effects are less noticeable with the reduced blurring of the image at the retina.

The pinhole aperture 20 is sized to provide pinhole imaging improvement for the patient's vision deficiency. The aperture 20 must be smaller than the patient's pupil size during bright light conditions, or else no vision improvement would be realized under the brighter conditions. Thus the aperture 20 must be smaller than approximately four mm, which is a typical human pupil diameter under bright lighting conditions. Since the contact lens may not always center over the patient's pupil, the lens is preferably fitted first, and the position of the annulus noted, and the lens then made to special order according to the fitting so the annulus centers over the patient's pupil.

At the same time, the pinhole aperture 20 must be greater than the diameter in which diffraction effects start to degrade image quality. In general, the benefits achieved by the pinhole aperture 20 can be destroyed by diffraction if very small apertures are incorporated into the pinhole contacts lenses. Such small apertures that have these adverse results include radial slits and scalloped patterns. Diffraction can actually increase the blurring of the retinal image such that the patient's vision is degraded rather than improved. Thus, to avoid unacceptable diffraction effects, the lower limit of a pinhole aperture in a usable contact lens is approximately two mm.

Therefore, the diameter of the pinhole aperture 20 is generally greater than two mm but less than four mm. In a preferred embodiment, the pinhole aperture 20 is approximately two mm.

In addition, the radial width of the annular mask 18, from the inside edge 24 to the outside edge 26, is preferably 0.75 mm to one mm. This dimension is sized in the practice of the invention to accommodate the normal function of the human pupil.

The lens body 12 can be constructed with material to form a hard, gas permeable, or soft contact lens 10. The outer diameter of the lens body 12 is approximately eight—fourteen mm, depending upon the patient's eye size.

It can be appreciated that the dimensions of the annular mask 18 can be adjusted for a particular patient. For example, the annular mask 18 can be sized for a particular pupil, or further optimized for a desired visual correction.

Figure 2A:
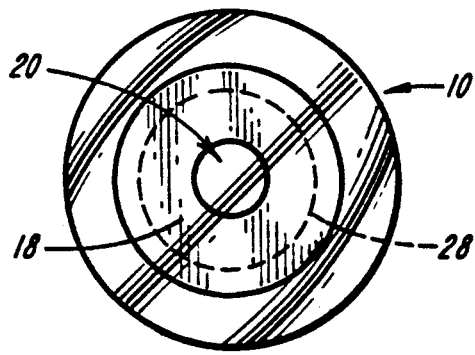
FIG. 2A is a diametrical sectional view of the lens of FIG. 2.
Figure 2:
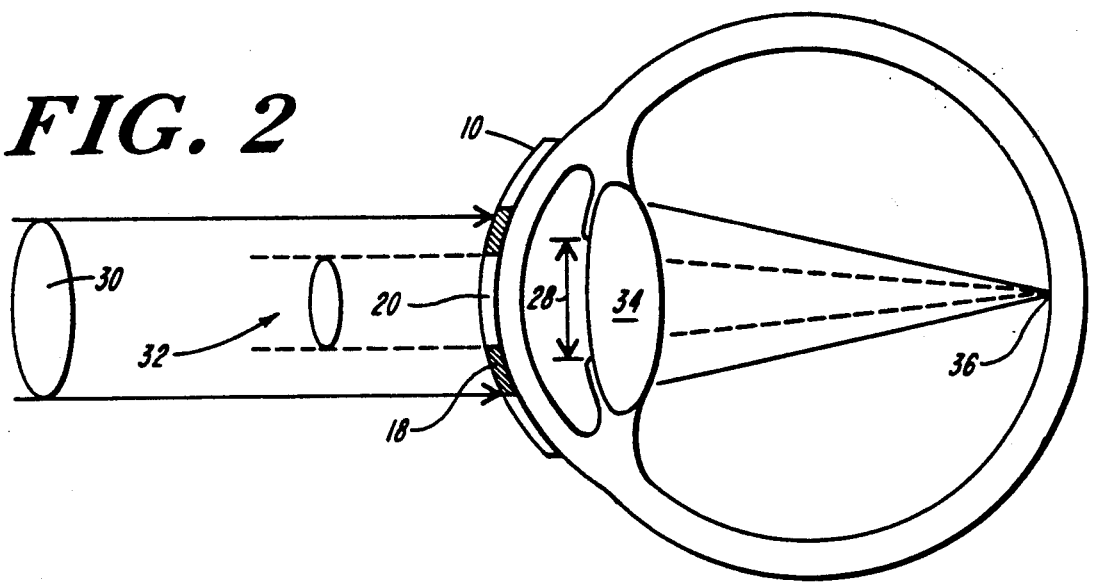
FIG. 2 illustrates an annular mask contact lens according to FIG. 1 and its relation to the human pupil during bright light conditions.

FIGS. 2 and 2A illustrate the relationship of the annular mask contact lens 10 of FIGS. 1 and 1A to the patient's contracted pupil 28 during bright light conditions. Light rays 30 show the bundle of light from a far object point which passes through the patient's pupil 28 without the contact lens 10. Light rays 32 show the smaller bundle of light from the same object point which passes through the patient's pupil with the contact lens 10. Light rays 32 pass by the edge of the pinhole aperture 20 and do not pass by the edge of the human pupil 28. The light rays 32 are focussed by the contact lens 10 and by the eye's refractive portions 34.

Under normal viewing, without the contact lens 10, the patient's retina 36 would receive all the light energy from the light rays 30. The light rays 30 would pass by the edge of the eye pupil 28 and eventually reach the retina 36, where the light energy is converted into signals Perceived by the brain.

However, while viewing through the contact lens 10 under bright light, or daylight, conditions, the pinhole aperture 20 created by the annular mask 18 restricts the effective light transmitting aperture so that only the light rays 32 pass through the eye pupil 28 and to the retina 36. Because the light rays 32 constitute a smaller geometrical extent upon the eye's refractive portions 34, as compared to the light rays 30, the aberrations at the retina 36 are reduced.

FIG. 2A shows that the functional size of the eye pupil 28 is optically larger than the effective diameter created by the pinhole aperture 20 of the contact lens 10 under bright light conditions. The light rays entering the eye through the pinhole aperture 20 are restricted to a smaller geometrical extent, as compared to the light rays which would otherwise pass through the eye pupil 28. The smaller bundle of light passing through the pinhole aperture 20 is thus more tightly focussed at the retina, thereby improving the clarity of objects viewed by the patient.

In contrast to FIGS. 2 and 2A, FIGS. 3 and 3A show the relationship of the annular mask contact lens 10 to the patient's dilated pupil 28 during lower light conditions. The bundle of light rays 38 from the same object point strikes the contact lens 10 in the regions 40, 42, and 44, and are focussed at the retina 36 by the contact lens 10 and the eye's refractive portions 34. The eye pupil 28 is illustratively shown as the patient's limiting aperture under normal viewing without the contact lens 10, where the patient would receive light energy from all the light rays 38. The light rays 38 would pass through the edge of the pupil 28 and eventually reach the retina 36. Because of the dimmer lighting, the patient's pupil 28 has dilated from its size shown in FIGS. 2 and 2A to acquire more light energy at the retina 36. The widely dilated pupil occurs most readily under dim illumination when a person's attention is primarily drawn to distant objects.

Figure 3A:
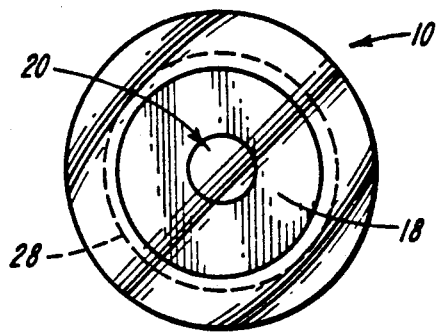
FIG. 3A is a diametrical sectional view of the lens of FIG. 3.
Figure 3:
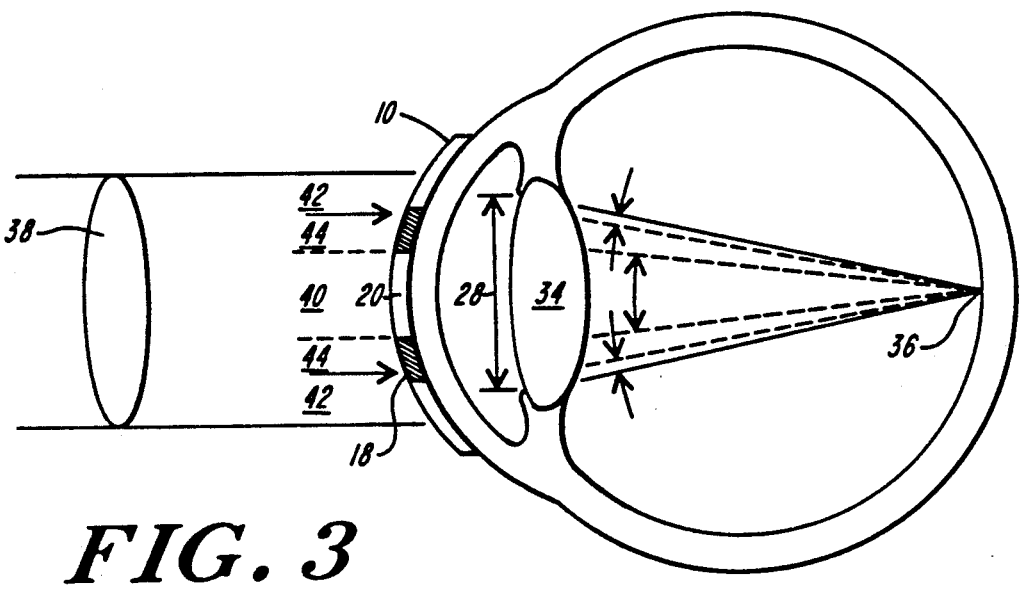
FIG. 3 illustrates an annular mask contact lens according to FIG. 1 and its relation to the human pupil during lower lighting conditions.

The annular mask 18 of the contact lens 10 is sized to increase the available transmission through the pupil 28 and to the retina 32 under dimmer lighting, as compared to bright light conditions. As seen in FIG. 3A, the pupil 28 is optically larger than the effective diameter of the annular mask 18 after the patient's pupil dilates. During lower light conditions, the patient can thus receive light rays 38 at the retina 36 through the transmitting regions 40 and 42. The energy passing through the region 40 is transmitted through the pinhole 20, and to the retina 36. The light energy passing through the region 42 is transmitted outside the annular mask 18 and to the retina 36. Some of the light rays 38 are blocked at the region 44 by the annular mask 18.

Accordingly, the contact lens 10 increasingly transmits more of the light rays 38 as the patient's pupil size increases or dilates. The patient is, therefore, better able to discern the same objects which were viewed under brighter conditions.

The size of the annular mask 18, and in particular the two mm pinhole aperture, provides other advantages. For example, during eye examinations, a doctor can pharmacologically dilate the pupil of a patient wearing the contact lens, and examine the entire retina, up to the periphery. This cannot be done through a normal pupil that is approximately two mm or less in diameter.

Figure 4:
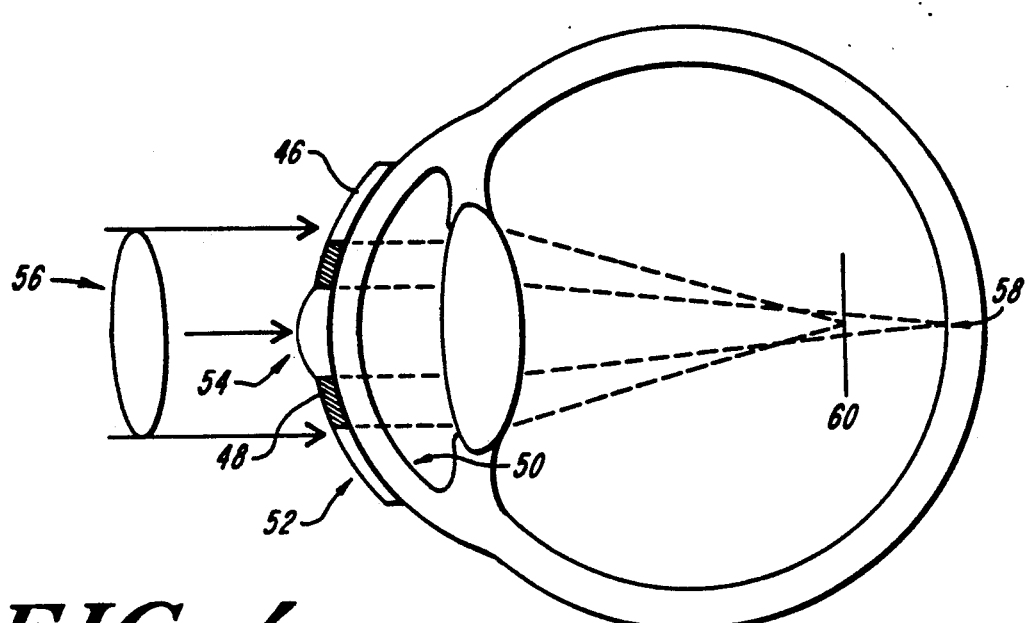
FIG. 4 illustrates a bi-powered annular mask contact lens constructed in accordance with further features of the invention.

FIG. 4 shows a preferred embodiment of the invention incorporating a bi-powered contact lens 46. The annular mask 48 and the concave surface 50 are arranged as described above, with reference to FIGS. 1 and 1A. The optical correction on the convex surface 52 of the contact lens 46 comprises two distinct optical corrections. In the region defined by the pinhole aperture 54, the convex surface 52 is optically powered to correct the patient's vision for in intermediate distance, between near and far objects. In addition, the convex surface 52 in the region outside the annular mask 48 is optically powered to correct the patient's vision for far objects.

As shown in FIG. 4, the light rays 56 which pass through the contact lens 46 enter both the pinhole aperture 54 and the region outside the annular mask 48 during lower lighting conditions, i.e., when the pupil 28 of FIG. 2 is dilated. However, the light rays 56, which originate from the same object point, effectively focus to different visual locations, illustratively shown as 58 and 60, because of the different optical corrections on convex surface 52. The light rays 56 which enter the pinhole aperture region 54 focus at an intermediate location 58 between near and far vision. The light rays 56 which pass outside the annular mask 48 focus at a location 60 representative of far vision.

Under brighter conditions, the pupil 28 of FIG. 2 contracts, and the light rays 56 enter only through the pinhole aperture 54, focusing at a point between near and far vision.

The bi-powered nature of the contact, together with the annular mask 48, enables the patient to view objects far and near under the differing light intensities. The intermediate optical power inside the annular mask 48 and the pinhole aperture 54 provide for the large depth of field.

Figure 5:
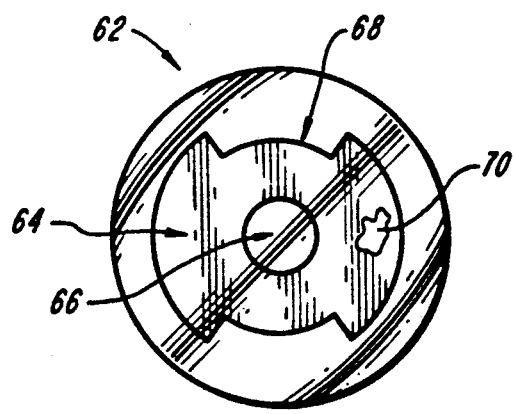
FIG. 5 illustrates an annular mask contact lens constructed in accordance with further features of the invention and which selectively blocks portions of the human pupil.

FIG. 5 shows another contact lens 62 according to the features of the invention which incorporates selective blocking by the mask 64. A pinhole aperture 66 and the annular mask diameter 68 are formed by the mask region 64 as described above in reference with FIGS. 2 and 2A. The mask region 64 is, in addition, selectively applied to areas outside the annulus outer diameter 68 to block light energy striking highly irregular portions 70 of the iris. For example, damaged iris, or iris regions removed in surgery, would be candidates for selective blocking by the mask region 64, thereby reducing the negative visual image effects relative to those areas 70.

Because the mask region 64 may be non-symmetric, the contact lens 62 can be weighted to maintain a particular orientation on the patient's eye.

Those skilled in the art will appreciate that the mask regions of the lenses 10, 46, and 62 in FIGS. 1-5 can be constructed in several ways. One practice uses a light-blocking element within the body of the contact lens to accomplish this function. Another practice uses a light-blocking coating applied to the lens body. In addition, it can be useful to utilize coatings which transmit light somewhere between zero and 100%, to take full advantage of the versatility in vision correction available in the pinhole contact lens which the invention provides.

Whether in the form of a coating or other structure, the mask region 18 (FIG. 1), 48 (FIG. 4) and 64 (FIG. 5) can have various selected levels of opacity. A high level of opacity is generally desired for maximal visual sharpness. However, a person may want a lower level of opacity to avoid a sense of visual dimness, i.e. to attain more brightness. The optical opacity of a mask region according to the invention accordingly can vary from lens to lens, as well as within a lens, to attain vision having a selected balance of factors.

It is thus seen that the invention efficiently attains the objects set forth above, among those apparent in the preceding description. In particular, the invention provides an annular mask contact lens capable of correcting human vision under differing lighting conditions and viewing distances.

It will be understood that changes may be made in the above constructions without departing from the scope of the invention. For example, the arrangement and size of the annular mask 18, as shown in FIGS. 1 and 1A, can be specifically manufactured for a particular patient to optimize the visual correction available in the pinhole contact lens 10. In another example, the contact lens body 12 can be constructed with a yellow appearance, giving a physiological impression of brighter lighting. In a further example, the contact lens 10, 46, and 62 in FIGS. 1-5 can be constructed with materials forming a soft, gas permeable, or hard contact lens. Those skilled in the art will appreciate that the invention can also aid patients suffering from other vision deficiencies and disorders.

It is accordingly intended that all matters contained in the above description or shown in the accompanying drawings be interpreted as illustrative rather than in a limiting way.

It is also to be understood that the following claims are intended to claim all of the specific and generic features of the invention as described herein, and all the statements of the scope of the invention.

What is claimed is:

1. A contact lens comprising
(A) an optically transparent lens body,
(B) said lens body having a concave surface optically powered to adapt to the patient's eye curvature,
(C) said lens body having a convex surface optically powered to correct the patient's vision for a focus between far and near objects,
(D) said lens body having an annular mask region of selected optical opacity,
(E) said annular mask region being arranged for
   (i) forming a substantially pinhole-like small aperture at the optical center of said lens,
   (ii) obscuring the Patient's optical pupil during bright lighting conditions except for said small aperture,
   (iii) permitting more light energy to pass through said lens body outside said annular mask region as the patient's Pupil dilates during lower lighting conditions.

2. A contact lens according to claim 1 wherein said convex surface further comprises an optical correction outside said annular mask region which corrects the patient's vision for far objects.

3. A contact lens according to claim 1 wherein said lens body is constructed with oxygen permeable material.

4. A contact lens according to claim 1 wherein said lens body is constructed with material to form a soft contact lens.

5. A contact lens according to claim 1 wherein the outer diameter of said lens body is approximately 8-14 mm.

6. A contact lens according to claim 1 wherein said pinhole aperture is approximately two mm in diameter.

7. A contact lens according to claim 1 wherein said annular mask region forms an annulus with a radial width of approximately 0.75 to one mm.

8. A contact lens according to claim 1 wherein said lens body has a yellow appearance.

9. A contact lens according to claim 1 wherein said annular mask is free of light passing apertures interrupting said optical opacity.

10. A non-surgical method for treating patients with visual aberrations, said method comprising the steps of
(A) fitting a patient with a contact lens optically powered for correct vision between near and far objects,
(B) applying an annular mask region of selected optical opacity to said contact lens, wherein
   (i) said annular mask region forms a substantially pinhole-like aperture for the patient's pupil,
   (ii) said annular mask region obscures the patient's pupil during bright lighting conditions except for said small aperture,
   (iii) said annular mask region permits more light energy to pass through the patient's pupil during lower lighting Conditions as the patient's pupil dilates.

11. A method according to claim 10 further comprising the step of applying an additional optical correction outside said annular mask region which corrects the patient's vision for far objects.

12. A method according to claim 10 further comprising the step of optimizing the size of the said annular mask region to fit a particular patient's pupil size and to modify geometrical vision aberrations.

13. A method according to claim 10 further comprising the step of applying additional mask outside said annular mask region to selectively block portions of the patient's pupil that contribute undesirable image artifacts.

14. A method according to claim 13 further comprising the step of weighting said contact lens for maintaining a particular orientation on the patient's eye.

15. A method according to claim 10 wherein said mask region is achieved through area blocking such that approximately 100% of the light energy is blocked at said mask region.

16. A method according to claim 10 wherein said mask region is achieved through variable transmission coatings such that some light energy may be transmitted through said mask region.

17. A method according to claim 10 wherein said mask region is achieved through a light-blocking element within said contact lens.

* * * * *

UNITED STATES PATENT AND TRADEMARK OFFICE
CERTIFICATE OF CORRECTION

PATENT NO. : 5,245,367

DATED : September 14, 1993

INVENTOR(S) : Miller et al.

It is certified that error appears in the above-identified patent and that said Letters Patent is hereby corrected as shown below:

On the Title Page, Item [57], line 8; "he " should read --the--.
Column 2, line 42, "t" should read --to--;

Column 5, line 25, "Perceived" should read --perceived--;

Column 7, line 66, "Patient's" should read --patient's--;

Column 8, line 3, "Pupil" should read --pupil--;

Column 8, line 40, "Conditions" should read --conditions--; and

Signed and Sealed this

Nineteenth Day of April, 1994

*Attest:*

BRUCE LEHMAN

*Attesting Officer*     *Commissioner of Patents and Trademarks*